(12) United States Patent
Ozaki et al.

(10) Patent No.: US 7,727,171 B2
(45) Date of Patent: Jun. 1, 2010

(54) VEHICLE SEATS WITH PLURALITY OF PNEUMATIC MASSAGING ELEMENTS

(75) Inventors: Takashi Ozaki, Toyota (JP); Masaki Hattori, Okazaki (JP); Noboru Nishiguchi, Hikone (JP)

(73) Assignees: Toyota Boshoku Kabushiki Kaisha, Aichi-ken (JP); Matsushita Electric Works, Ltd., Osaka (JP)

( * ) Notice: Subject to any disclaimer, the term of this patent is extended or adjusted under 35 U.S.C. 154(b) by 206 days.

(21) Appl. No.: 11/335,917

(22) Filed: Jan. 19, 2006

(65) Prior Publication Data

US 2006/0217644 A1    Sep. 28, 2006

(30) Foreign Application Priority Data

| Jan. 19, 2005 | (JP) | ............................. 2005-011442 |
| Jan. 19, 2005 | (JP) | ............................. 2005-011443 |
| Mar. 30, 2005 | (JP) | ............................. 2005-097808 |

(51) Int. Cl.
| A61H 9/00 | (2006.01) |
| A61H 23/04 | (2006.01) |
| A47C 7/02 | (2006.01) |
| A47C 27/10 | (2006.01) |

(52) U.S. Cl. ........................ 601/105; 601/148; 601/149; 297/284.3; 297/284.6; 5/710; 5/713

(58) Field of Classification Search .................. 601/98, 601/101, 103, 105, 107, 108, 111, 148–152; 297/284.3, 452, 284.6, 284.8; 5/710, 713, 5/722, 729

See application file for complete search history.

(56) References Cited

U.S. PATENT DOCUMENTS

| 3,326,601 | A | * | 6/1967 | Parkinson et al. ........ 297/284.6 |
| 4,186,734 | A | * | 2/1980 | Stratton ...................... 601/148 |
| 4,555,140 | A | * | 11/1985 | Nemoto ................. 297/452.54 |
| 5,029,939 | A | * | 7/1991 | Smith et al. ............... 297/284.1 |
| 5,076,643 | A | * | 12/1991 | Colasanti et al. ......... 297/284.6 |
| 5,558,398 | A | * | 9/1996 | Santos ..................... 297/284.3 |
| 5,848,982 | A | * | 12/1998 | Hoshino et al. ............. 601/150 |
| 6,652,029 | B2 | * | 11/2003 | McMillen ................ 297/284.4 |
| 7,140,680 | B2 | * | 11/2006 | McMillen et al. ........ 297/284.9 |

FOREIGN PATENT DOCUMENTS

| DE | 3334864 A1 | * | 4/1985 |
| JP | 63-46136 | | 3/1988 |

(Continued)

*Primary Examiner*—Danton DeMille
(74) *Attorney, Agent, or Firm*—Patterson, Thuente, Christensen, Pedersen, P.A.

(57) ABSTRACT

A vehicle seat may include a seat back that has a back frame, a cushion pad attached to the back frame, and a massaging unit having a plurality of massaging elements. The cushion pad has a plurality of through bores that pass therethrough in the direction of thickness thereof. The massaging elements are constructed so as to be elastically deformed or compressed along moving axes and to be pneumatically expanded and contracted along the moving axes. The massaging elements are disposed in the through bores in a manner that the moving axes of the massaging elements extend along longitudinal axes of the through bores. The massaging elements have deformability or compressibility identical with or greater than the deformability or compressibility of the cushion pad when the massaging elements are not operated.

11 Claims, 9 Drawing Sheets

FOREIGN PATENT DOCUMENTS

| | | |
|---|---|---|
| JP | 7-333 | 1/1995 |
| JP | 7-236671 | 9/1995 |
| JP | 11-235368 | 8/1999 |
| JP | 2001-198167 | 7/2001 |
| JP | 2001-212190 | 8/2001 |
| JP | 2001-224657 | 8/2001 |
| JP | 2001-252315 | 9/2001 |
| JP | 2002-011062 | 1/2002 |
| JP | 2002-301128 | 10/2002 |
| JP | 2005-087604 | 4/2005 |

* cited by examiner

VEHICLE SEATS WITH PLURALITY OF PNEUMATIC MASSAGING ELEMENTS

BACKGROUND OF THE INVENTION

1. Field of the Invention

The present invention relates to seats for a vehicle. More particularly, the present invention relates to seats of a vehicle that have a massaging function.

2. Description of the Related Art

A seat of a vehicle having a massaging mechanism is already known. Such a seat (a power seat) is taught, for example, by Japanese Laid-Open Utility Model Publication No. 63-46136.

In the known power seat, the massaging mechanism has a plurality of vibrating devices (hummers) that are provided to a cushion pad of a seat back. Typically, the vibrating devices are movably disposed within a plurality through holes formed in the cushion pad and are coupled to a drive unit having a drive motor.

The vibrating devices thus disposed can be driven by the drive motor so as to discontinuously push the back of a passenger, thereby providing a massaging function for the passenger. As a result, the power seat thus constructed may provide the passenger with a relaxing effect.

However, in the power seat thus constructed, the vibrating devices are typically formed from rigid elastic materials such as hard rubber. Generally, such vibrating devices cannot be easily deformed or contracted when subjected to a compression force. Therefore, the vibrating devices may sometimes provide strong discomfort to the back of the passenger when the passenger is sitting on the seat while the vibrating devices are not operated, in particular, when the passenger is relatively firmly pressed toward the seat back due to the rocking motion or vibration of the moving vehicle.

Further, a different type of massaging mechanism is also known. Such a massaging mechanism is taught, for example, by Japanese Laid-Open Patent Publication No. 10-201804. The massaging mechanism taught by No. 10-201804 is intended to be used for a general massaging device. This massaging mechanism has a plurality of massaging elements each having an air bag that can be inflated or deflated by air supply and discharge.

It is considered that such a pneumatically movable massaging mechanism can be used for a vehicle seat. If the pneumatically movable massaging mechanism is combined with the vehicle seat (i.e., if in the power seat taught by No. 63-46136, the massaging mechanism utilizing the vibrating devices is replaced with the massaging mechanism taught by No. 10-201804), it is expected that the above described disadvantage can be overcome.

However, the pneumatically movable massaging mechanism may require complicated piping, correspondingly many fittings, or other such members. Therefore, labor-intensive and time consuming work is required to manufacture a power seat having such a massaging mechanism. This may lead to an increased manufacturing cost.

SUMMARY OF THE INVENTION

It is, accordingly, one object of the present teachings to provide an improved, vehicle power seat having a massaging mechanism.

For example, in one aspect of the present teachings, a vehicle seat may include a seat back that has a back frame, a cushion pad attached to the back frame, and a massaging unit having a plurality of massaging elements. The cushion pad has a plurality of through bores that pass therethrough in the direction of thickness thereof. The massaging elements are constructed so as to be elastically deformed or compressed along the moving axes and also be pneumatically expanded and contracted along the moving axes. The massaging elements are disposed in the through bores in a manner that the moving axes of the massaging elements extend along longitudinal axes of the through bores. The massaging elements have deformability or compressibility identical with or greater than the deformability or compressibility of the cushion pad when the massaging elements are not being operated.

According to this seat, when the massaging unit is not operated, the massaging elements can be easily deformed or compressed along with the cushion pad. Therefore, the massaging unit does not provide discomfort to a passenger when the passenger is sitting on the seat.

In one embodiment, special connector units are used in order to interconnect the air pipes and the massaging elements. Each of the connector units has a first connector element having a first connecting portion that can be connected to the massaging element, and a second connector element having a second connecting portion that can be connected to the air pipe. The first and second connector elements of each of the connector units are arranged and constructed such that the first and second connecting portions can be positioned on opposite sides of an attachment member that connects the massaging elements to the back frame. According to the connector units thus constructed, the air pipes can be easily connected to the massaging elements. In addition, it is not necessary to provide an additional space for the connector units.

In another embodiment, the moving axes of some of the massaging elements are directed to a direction different from the direction of the moving axes of the remaining massaging elements. According to this construction, the back side of the passenger can be effectively massaged.

Other objects, features, and advantages, of the present invention will be readily understood after reading the following detailed description together with the accompanying drawings and the claims.

DETAILED DESCRIPTION OF THE INVENTION

A representative example of the present invention has been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detailed description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

A detailed representative embodiment of the present teachings is shown in FIG. 1 to FIG. 9.

Figure 1:
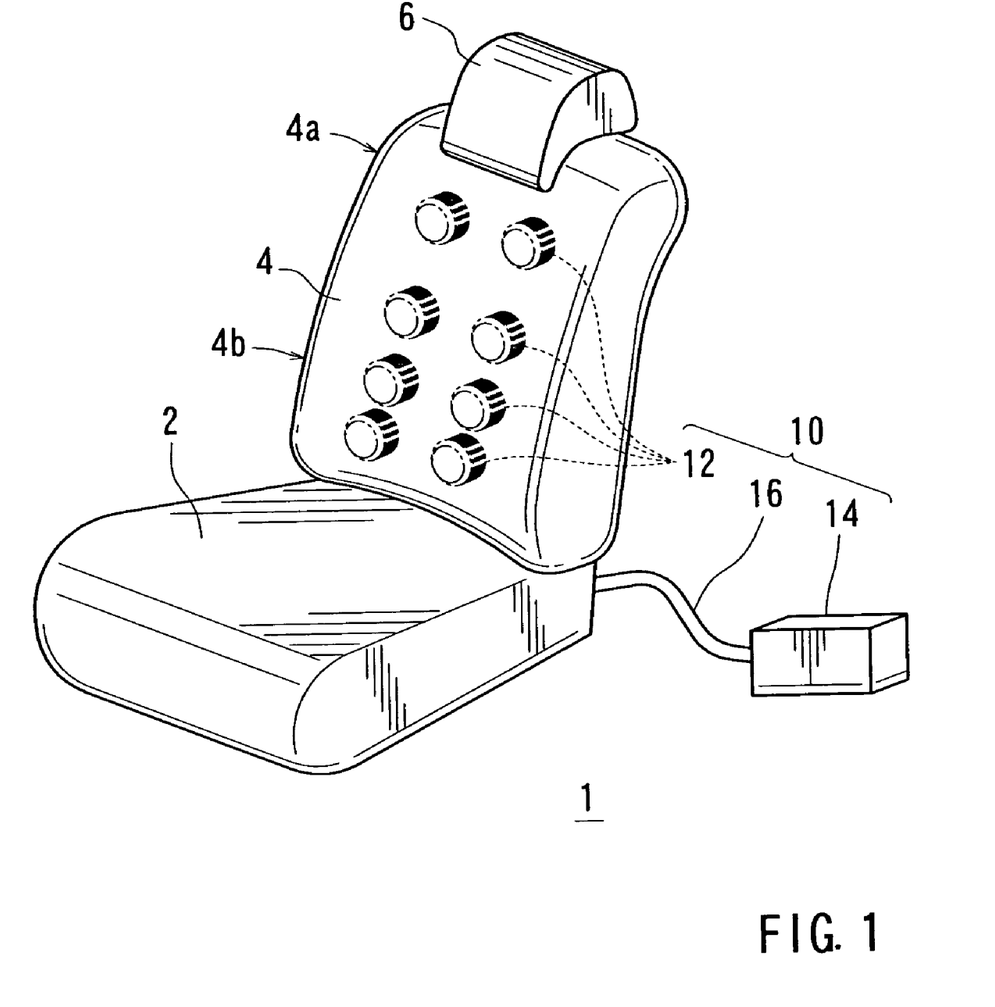
FIG. 1 is a perspective view of a vehicle seat having a massaging mechanism according to a representative embodiment of the present invention.
Figure 2:
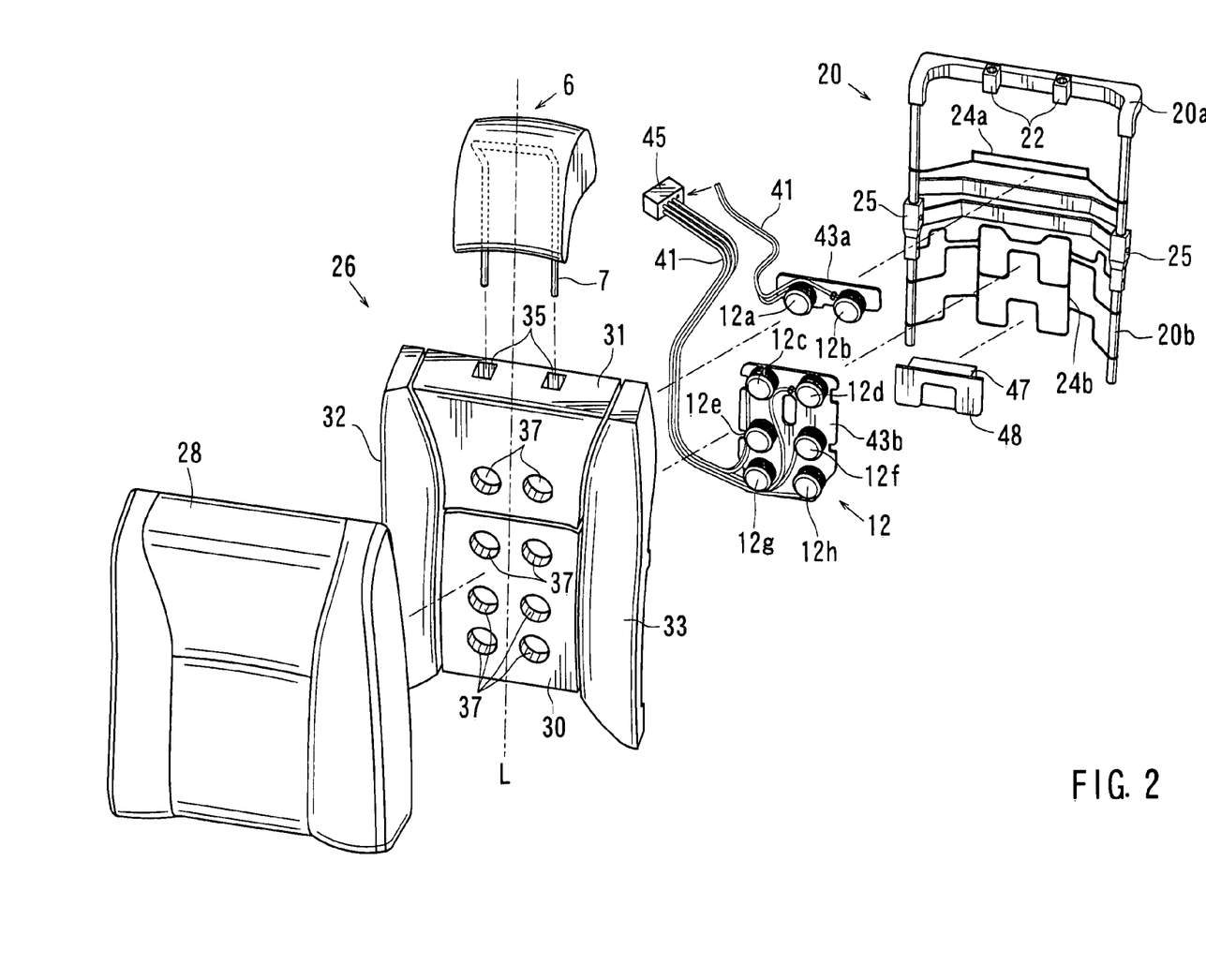
FIG. 2 is an exploded perspective view of a seat back of the vehicle seat shown in FIG. 1.

As shown in FIG. 1, a vehicle seat (front seat) 1 is a reclinable and partly tiltable type seat and includes a seat cushion 2, a seat back 4, and a head rest 6 attached to the seat back 4. The vehicle seat 1 further includes a massaging mechanism 10. The massaging mechanism 10 is generally composed of a massaging unit 12 that is attached to the seat back 4, an actuator 14, and a supplemental massaging unit 47 (FIG. 2). The actuator 14 is communicated with the massaging unit 12 via a plurality of (eight in this embodiment) hoses 16 and is electrically connected to the supplemental massaging unit 47 via a cable (not shown). Further, the seat back 4 is a so-called split type seat back. That is, the seat back 4 is divided to an upper portion 4a and a lower portion 4b so that the upper portion 4a can tilt back and forth relative to the lower portion 4b.

As shown in FIG. 2, the seat back 4 is constituted of a rectangular back frame 20, a back cushion pad 26 attached to the back frame 20, and a outer cover 28 that covers or encloses the cushion pad 26. The back frame 20 is constituted of an upper frame portion 20a and a lower frame portion 20b that are movably or rotatably connected to each other via a pair of hinge members 25. Typically, the back frame 20 is arranged and constructed such that the upper frame portion 20a is normally slightly inclined forwardly relative to the lower frame portion 20b. The upper frame portion 20a may preferably be connected to a drive mechanism (not shown) so that the upper frame portion 20a can move or tilt back and forth relative to the lower frame portion 20b. Generally, the upper frame portion 20a can tilt relative to the lower frame portion 20b such that the upper portion of the seat back 4 can move between a first position shown in FIGS. 7 and 9 and a second position shown in FIG. 8. Typically, the drive mechanism is constituted of a screw shaft (not shown) connected to the upper frame portion 20a, a nut (not shown) engaging the screw shaft and attached to the lower frame portion 20b, and a drive motor (not shown) that can rotate the nut. Further, the upper frame portion 20a is provided with a pair of head rest attachment members 22 that are arranged and constructed so as to movably receive head rest stays 7 of the head rest 6. The lower frame portion 20b is rotatably connected to a cushion frame (not shown) of the seat cushion 2 via a seat reclining device (not shown) so that the back frame 20 can be reclined back and forth relative to the cushion frame.

The back frame 20 is provided with upper and lower retainer springs 24a and 24b that can retain the massaging unit 12. The upper retainer spring 24a is positioned at a lower central portion of the upper frame portion 20a. The upper retainer spring 24a is attached to the upper frame portion 20a so as to extend transversely thereof. Conversely, the lower retainer spring 24b is attached to the lower frame portion 20b so as to extend transversely thereof. As will be apparent from FIG. 2, the upper and lower retainer springs 24a and 24b are arranged and constructed to curve or project rearwardly and are positioned in parallel with the upper and lower frame portions 20a and 20b. Also, the upper and lower retainer springs 24a and 24b can be flexed back and forth. Further, the upper and lower retainer springs 24a and 24b may preferably be constructed from a combined wire spring that is formed from a plurality of wires.

The cushion pad 26 is made from soft urethane foam or other such materials having desired deformability and compressibility and is shaped such that the seat back 4 may have a desired shape when the outer cover 28 is put thereon. As shown in FIG. 2, the cushion pad 26 is composed of a first or main portion 30 corresponding to a central portion of the lower frame portion 20b, a second or upper portion 31 corresponding to a central portion of the upper frame portion 20a, and side portions 32 and 33 corresponding to side portions of the upper and lower frame portions 20a and 20b. Further, the upper portion 31 is formed with a pair of holes 35 that are aligned with the head rest attachment members 22 of the upper frame portions 20a.

The main portion 30 and the upper portion 31 are formed with a plurality of pairs of through bores 37 that extend back and forth therethrough. As will be appreciated, the pairs of through bores 37 are arranged so as to correspond to the upper and lower retainer springs 24a and 24b of the back frame 20 (i.e., so as to correspond to the massaging unit 12 retained by the upper and lower retainer springs 24a and 24b). In this embodiment, the main portion 30 is formed with three pairs of right and left through bores 37 that pass therethrough in the direction of thickness thereof. Conversely, the upper portion 31 is formed with a pair of right and left through bores 37 that pass therethrough in the direction of thickness thereof. Each pair of through bores 37 are positioned symmetrically with a vertical center line L of the cushion pad 26. Each of the through bores 37 may preferably be a cylindrical bore having a diameter of about 60 mm. Further, each of the through bores 37 may preferably be positioned such that the distance between the center line L of the cushion pad 26 and the through bore 37 is about 25-30 mm. In other words, each of through bores 37 may preferably be positioned such that the distance between the center line L of the cushion pad 26 and a center of the through bore 37 is about 55-60 mm.

As shown in FIG. 2, the outer cover 28 is a bag-shaped member that is shaped so as to substantially conform to the contour of the cushion pad 26. Typically, the outer cover 28 is composed of a plurality of cover parts that are made from woven fabric, knit fabric, resin sheet materials or other such materials. The cover parts may preferably be assembled by stitching, welding or other such methods, thereby forming the outer cover 28.

As shown in FIG. 2, the massaging unit 12 is composed of a pair of right and left massaging elements 12a and 12b, and three pairs of right and left massaging elements 12c-12h. The massaging elements 12a and 12b are attached to an upper attachment plate 43a so as to be connected to the upper retainer spring 24a via the upper attachment plate 43a. Further, the massaging elements 12a and 12b are positioned on the upper attachment plate 43a so as to correspond to the pair of through bores 37 formed in the upper portion 31 of the cushion pad 26. Conversely, the massaging elements 12c-12h are attached to a lower attachment plate 43b so as to be connected to the lower retainer spring 24b via the lower attachment plate 43b. Similarly, the massaging elements 12c-12h are positioned on the lower attachment plate 43b so as to correspond to the pairs of through bores 37 formed in the main portion 30 of the cushion pad 26. The attachment plates 43a and 43b are preferably made from resins, fiber reinforced plastics, metal or other such materials. Typically, the attachment plates 43a and 43b can be connected to the upper and lower retainer springs 24a and 24b by clamping, binding or other such methods so that the massaging unit 12 (the massaging elements 12a-12h) can be attached to the upper and lower retainer springs 24a and 24b. Naturally, these two attachment plates 43a and 43b can be replaced with three or more attachment plates. For example, eight attachment plates can be used so that the massaging elements 12a-12h can be independently attached to the upper and lower retainer springs 24a and 24b.

Figure 3:
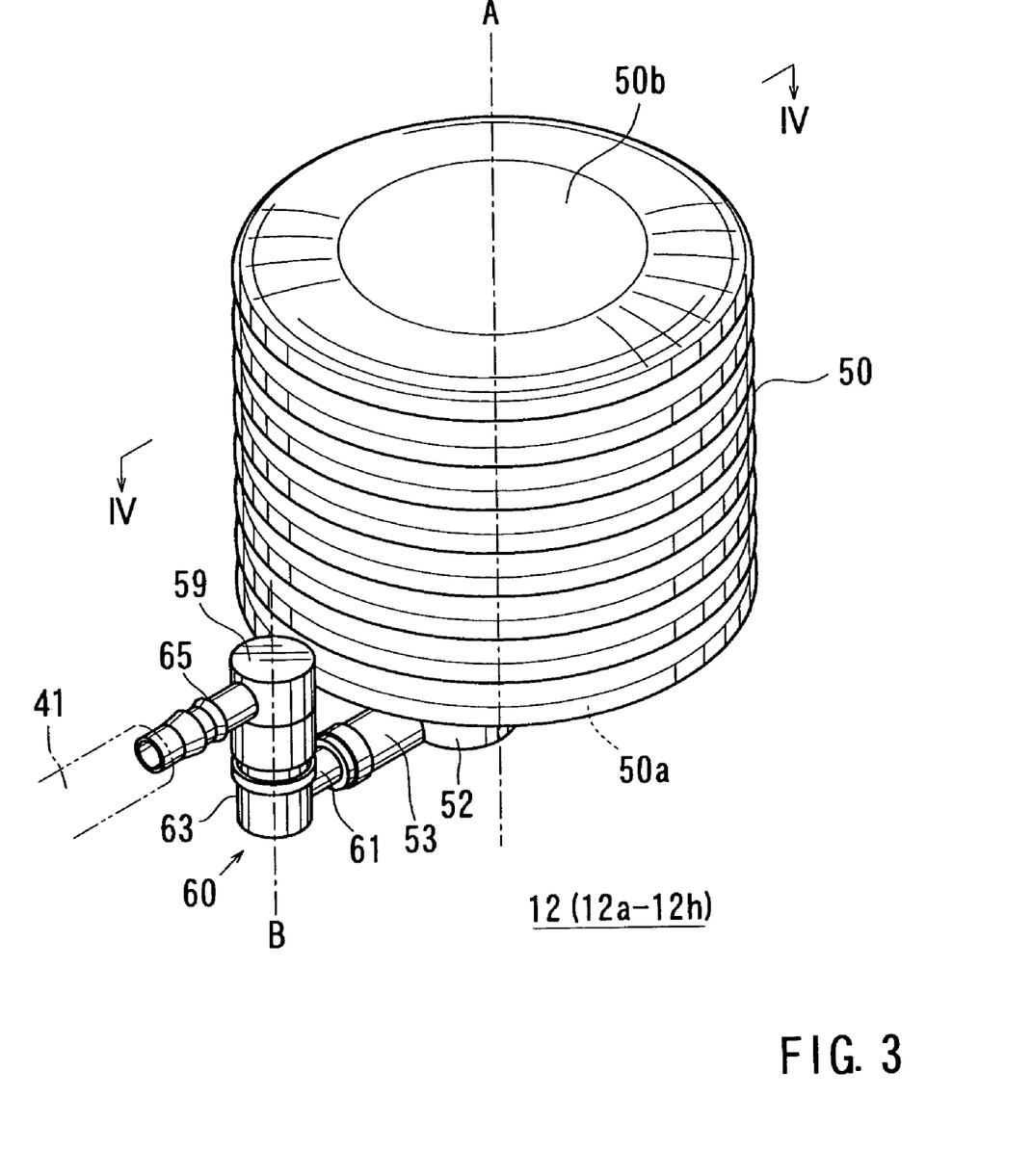
FIG. 3 is a perspective view of a massaging element connected to a connector unit.
Figure 4:
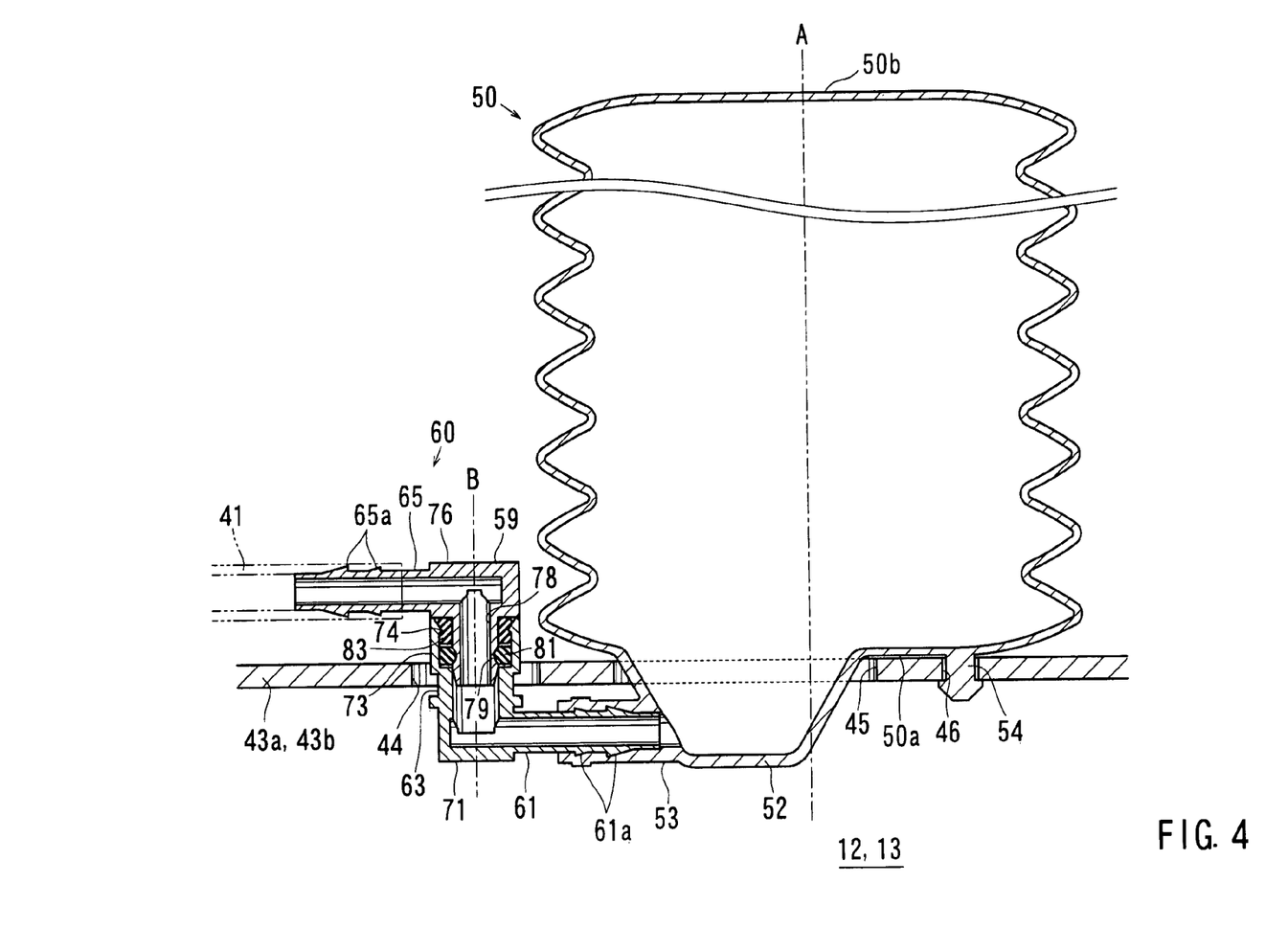
FIG. 4 is a cross-sectional view taken along line IV-IV in FIG. 3.
Figure 5:
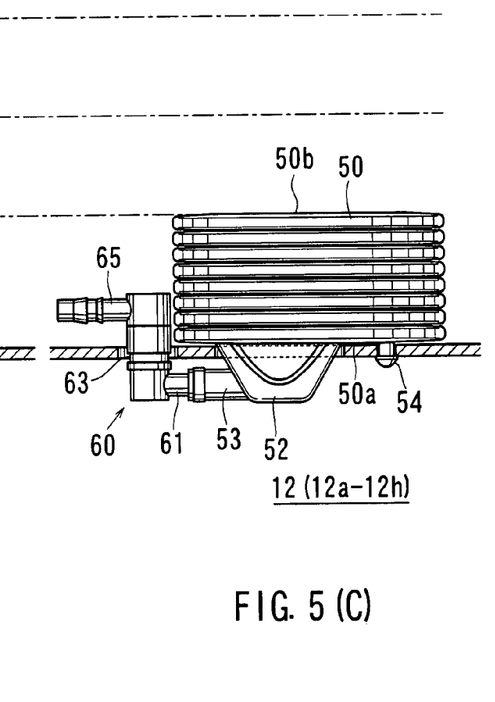
FIG. 5A is a side view of the massaging element connected to the connector unit, in which the massaging element is in an expanded condition.
FIG. 5B is a side view of the massaging element connected to the connector unit, in which the massaging element is in a normal condition.
FIG. 5C is a side view of the massaging element connected to the connector unit, in which the massaging element is in a contracted condition.

As shown in FIGS. 3 and 4, the massaging elements 12a-12h are formed as corrugated cylindrical hollow members 50 (one of which is shown). The corrugated hollow members 50 are pneumatically actuated so as to be expanded and contracted along respective moving axes A. Also, the corrugated hollow members 50 can be elastically deformed or compressed along the moving axes A when an external force is applied thereto. Preferably, the corrugated hollow members 50 are constructed so as to have a deformability or compressibility that is identical with or greater than the deformability or compressibility of the cushion pad 26. The corrugated hollow members 50 have bottom portions 50a and lid portions (i.e., movable portions or massaging portions) 50b. The bottom portions 50a of the corrugated hollow members 50 are formed with air passage portions 52 so that air can be introduced into and discharged from the corrugated hollow members 50 therethrough. The air passage portions 52 have a downwardly projected frustoconical shape and have tubular projections 53 that are connected to air pipes 41 via connector units 60. The tubular projections 53 are arranged so as to laterally extend from the air passage portions 52 (i.e., so as to extend in parallel with the attachment plate 43a or 43b when the corrugated hollow members 50 are attached to the attachment plate 43a or 43b). Further, the bottom portions 50a are provided with headed engagement projections 54 that are used in order to attach the corrugated hollow members 50 to the attachment plates 43a and 43b.

Further, the air pipes 41 connected to the corrugated hollow members 50 of the respective massaging elements 12a-12h are connected to a connector 45 (FIG. 2). The connector 45 is connected to the hoses 16 that are communicated with the actuator 14 (FIG. 1). Therefore, the air pipes 41 are respectively communicated with the corresponding hoses 16 via the connector 45 so that the massaging elements 12a-12h can be individually controlled. Although not shown, the actuator 14 may preferably include an air pump, valve units (e.g., three way valves), and a control unit. The control unit can control the valve units so that air can be alternately supplied to and discharged from the hoses 16. As described above, in this embodiment, the number of the hoses 16 is eight so that the massaging elements 12a-12h can be individually controlled. However, the number of the hoses 16 can be changed. For example, the number of the hoses 16 can be reduced to four so as to control the massaging elements 12a-12h two at a time. As will be appreciated, in such a case, the (eight) air pipes 41 are distributed to the (four) hoses 16 two at a time.

As shown in FIG. 4, the upper and lower attachment plates 43a and 43b are formed with through bores 44 and 45 that can respectively receive the connector units 60 and the air passage portions 52 of the corrugated hollow members 50. Also, the upper and lower attachment plates 43a and 43b are formed with engagement bores 46. The engagement bores 46 are to be fitted with the engagement projections 54 of the corrugated: hollow members 50 in order to attach the corrugated hollow members 50 to the attachment plates 43a and 43b.

Each of the corrugated hollow members 50 may preferably be shaped so as to be axially movably received within each of the through bores 37 formed in the cushion pad 26. In other words, the lid portion 50b may preferably have substantially the same shape and diameter (about 60 mm) as the cross-sectional shape and diameter of the through bore 37 so that only a small circumferential clearance is formed therebetween when the corrugated hollow member 50 is received within the through bore 37. Typically, the diameter of the lid portion 50b of the corrugated hollow member 50 is determined such that the lid portion 50b has a surface area of about 90-100 percent of the cross-sectional area of the through bore 37. Further, the lid portion 50b may preferably have a smooth surface.

As shown in FIGS. 3, 4 and 5A-5C, each of the connector unit 60 may preferably include a first connector element 71 and a second connector element 76. The first connector element 71 is composed of a first tubular body portion 63 and a first tubular connecting portion 61 that are formed as single piece. The first connecting portion 61 is to be coupled to the tubular projection 53 formed in the air passage portion 52 of the corrugated hollow member 50. The first connecting portion 61 laterally extends from a proximal end of the first body portion 63 at substantially a right angle with a longitudinal axis B of the first body portion 63. The first connecting portion 61 has shape and size so as to be closely inserted into the tubular projection 53 such that a hermetic connection can be formed therebetween. Also, the first connecting portion 61 is circumferentially formed with outer annular ribs 61a so as to be effectively prevented from disengaging from the tubular projection 53. Conversely, the second connector element 76 is composed of a second hollow body portion 59 and a second tubular connecting portion 65 that are formed as a single piece. The second connecting portion 65 is to be coupled to the air pipe 41. The second connecting portion 65 laterally extends from the second body portion 59. The second connecting portion 65 has a shape and a size so as to be closely inserted into the air pipe 41 such that a hermetic connection can be formed between the second connecting portion 65 and the air pipe 41. Also, the second connecting portion 65 is circumferentially formed with outer annular ribs 65a so as to be effectively prevented from disengaging from the air pipe 41. The second body portion 59 is formed with a coupling extension 78 that extends substantially at a right angle with the second connecting portion 65. The coupling extension 78 is coaxially loosely received within an enlarged coupling portion 73 formed in the first body portion 63 of the first connector element 71 so as to rotate relative to each other about the axis B of the first body portion 63. Therefore, the second body portion 59 can be rotated relative to the first body portion 63 about the axis B. As a result, the second connecting portion 65 can be rotated relative to the first connecting portion 61 about the axis B. Further, an O-ring seal 81 is received in an annular groove 79 formed in the coupling extension 78 so as to seal between the coupling portion 73 and the coupling extension 78, thereby sealing between the first and second connector elements 71 and 76. Also, a hold-down member or annular spacer 83 is disposed between the coupling extension 78 and the coupling portion 73 so as to prevent the O-ring seal 81 from deviating from the annular groove 79. Further, the coupling portion 73 of the first body portion 63 is formed with an annular projection 74 so that the spacer 83 can be immovably positioned or fixed at a predetermined position.

As shown in FIG. 2, the supplemental massaging unit 47 may preferably be a vibration generator or vibrator that can be electrically actuated. The supplemental massaging unit 47 is attached to an attachment plate 48 so as to be connected to the lower retainer spring 24b via the attachment plate 48. Similar to the attachment plates 43a and 43b, the attachment plate 48 can be connected to the lower retainer spring 24b by clamping or binding so that the supplemental massaging unit 47 can be attached to the lower retainer spring 24b. The supplemental massaging unit 47 may generate vibration and transmit the generated vibration to the three pairs of massaging elements 12c-12h attached to the lower retainer spring 24b, thereby assisting the massaging function of the massaging elements 12c-12h.

The seat back 4 having the massaging unit 12 is typically assembled or formed as follows.

First, the massaging unit 12 (the massaging elements 12a-12h) is attached to the upper and lower attachment plates 43a and 43b. That is, the corrugated hollow members 50 of the respective massaging elements 12a-12h are attached to the attachment plates 43a and 43b by fitting the engagement projections 54 into the corresponding engagement bores 46 while the air passage portions 52 of the corrugated hollow members 50 are inserted into the through bore 45. Thereafter, the connector units 60 are attached to the corrugated hollow members 50 of the respective massaging elements 12a-12h. That is, the first connecting portions 61 of the connector units 60 are inserted into the tubular projections 53 formed in the air passage portions 52 of the corrugated hollow members 50 while the first body portions 63 are received within the through bores 44 formed in the attachment plates 43a and 43b. At this time, the connector units 60 may preferably be directed or oriented such that the first body portions 63 are disposed adjacent to the corrugated hollow members 50 while the axes B of the first body portions 63 are in parallel with the axes A of the corrugated hollow members 50. As will be appreciated, the second connecting portions 65 of the connector units 60 are positioned on the side opposite to the first connecting portions 61 relative to the attachment plates 43a and 43b. In other words, the second connecting portions 65 are positioned on the same side as the corrugated hollow members 50 relative to the attachment plates 43a and 43b. Thus, the corrugated hollow members 50 and the connector units 60 are combined with the attachment plates 43a and 43b.

The upper and lower attachment plates 43a and 43b having the corrugated hollow members 50 and the connector units 60 are then connected to the upper and lower retainer springs 24a and 24b. Thus, the massaging elements 12a-12h are combined with the back frame 20. Subsequently, the air pipes 41 are connected to the second connecting portions 65 of the connector units 60. Thus, the massaging elements 12a-12h combined with the back frame 20 are communicated with the actuator 14 via the air pipes 41 and the hoses 16.

As described above, the second connecting portions 65 of the connector units 60 are positioned on the same side as the corrugated hollow members 50 relative to the attachment plates 43a and 43b. Further, the second connecting portions 65 can be rotated relative to the first connecting portions 61. Therefore, the air pipes 41 can be easily connected to the second connecting portions 65 of the connector units 60. Also, the air pipes 41 connected to the second connecting portions 65 can be easily and freely handled on the attachment plates 43a and 43b.

Thereafter, the supplemental massaging unit 47 is attached to the lower retainer spring 24b via the attachment plate 48. Thus, the massaging unit 12 and the supplemental massaging unit 47 are combined with the back frame 20. Thereafter, the cushion pad 26 is attached to the back frame 20 while the corrugated hollow members 50 are inserted into the corresponding through bores 37 formed in the cushion pad 26 in a manner that the moving axes A thereof extend coincident to longitudinal axes of the through bores 37. Finally, the outer cover 28 is put on the cushion pad 26. Thus, the seat back 4 shown in FIG. 1 is formed.

Figure 6:
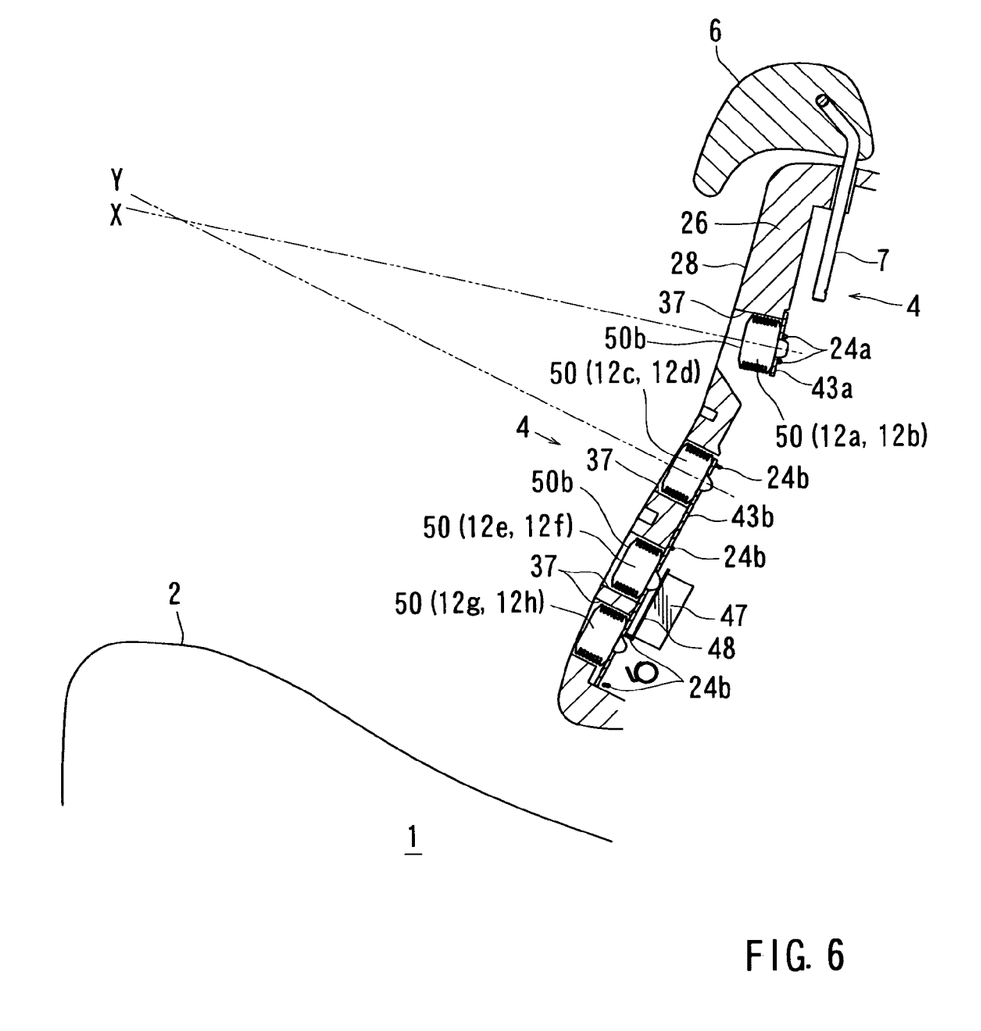
FIG. 6 is a vertical cross-sectional view of the vehicle seat having the massaging mechanism, in which the seat back is in a normal position.

In the seat back 4 thus formed, the cushion pad 26 may appropriately be reshaped by the outer cover 28 so that the seat back 4 may have a natural curvature that can suitably support the backside of a passenger. As shown in FIG. 6, the corrugated hollow members 50 (the massaging unit 12 of the massaging mechanism 10) are positioned such that the lid portions 50b are in contact with or closely adjacent to the outer cover 28. Further, as shown in FIG. 6, the direction X of the moving axis A of each of the massaging elements 12a and 12b is not in parallel with the direction Y of the moving axis A of each of the massaging elements 12c-12h. That is, the direction X is directed more downwardly than the direction Y. This is because the upper frame portion 20a is slightly forwardly inclined relative to the lower frame portion 20b.

Figure 7:
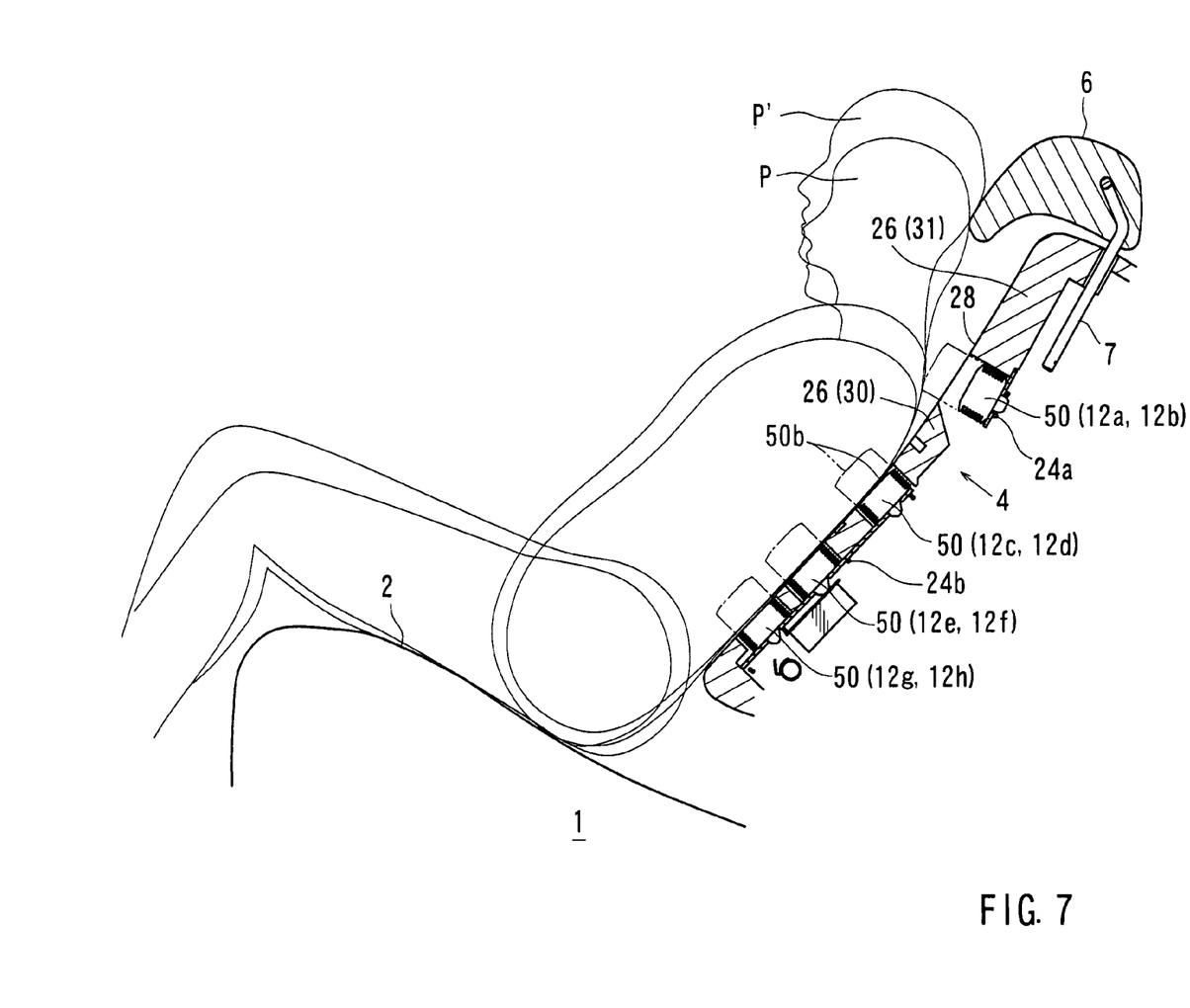
FIG. 7 is a vertical cross-sectional view of the vehicle seat having the massaging mechanism, illustrating a condition in which a passenger is sitting on the seat in which the seat back is in a reclined position.

As shown in FIG. 7, when a passenger P sits on the seat 1 in which the seat back 4 is in a reclined position, the seat back 4 is pressed rearwardly by the backside of the passenger P. As a result, the main portion 30 of the cushion pad 26 is depressed or deformed so as to conform to a shape of the backside shape of the passenger P due to the deformability thereof. At the same time, the corrugated hollow members 50 of the massaging elements 12c-12h corresponding to the main portion 30 of the cushion pad 26 are deformed or compressed while the lid portions 50b thereof contact the backside of the passenger P through the interleaving of the outer cover 28. Further, at this time, the remaining corrugated hollow members 50 of the massaging elements 12a and 12b corresponding to the upper portion 31 of the cushion pad 26 are not generally deformed or compressed because the upper portion 31 of the cushion pad 26 is not directly or forcibly pressed by the passenger backside.

According to the present seat back 4, when the passenger P sits on the seat 1 under a condition in which the corrugated hollow members 50 of the massaging elements 12c-12h are in a normal condition (i.e., a condition in which the massaging mechanism 10 is not operated), the corrugated hollow members 50 can be easily deformed or compressed along with the main portion 30 of the cushion pad 26 so as to correspond to the shape of the backside of the passenger P because the corrugated hollow members 50 have substantially the same deformability or compressibility as the cushion pad 26. Therefore, the corrugated hollow members 50 do not provide discomfort to the passenger P when the passenger P is sitting on the seat 1, even if the passenger P is firmly pressed against the seat back 4 due to rocking motion or vibration of the vehicle.

Next, an operation of the massaging mechanism 10 will be described with reference to, in particular, FIGS. 5A to 5C and 7 to 9.

First, the passenger P sits on the seat 1 in which the seat back 4 is in a reclined position (FIG. 7). Thereafter, the passenger P actuates the control unit of the actuator 14 in order to control the valve units so that air is alternately supplied to and discharged from the hoses 16. As a result, air is alternately supplied to and discharged from the corrugated hollow members 50 of the massaging unit 12 (the massaging elements 12a-12h) via the air pipes 41. When air is supplied to and discharged from the corrugated hollow members 50, the corrugated hollow members 50 are alternately axially expanded and contracted so as to be projected from and retracted into the through bores 37. That is, when air is supplied to and discharged from the corrugated hollow members 50, the corrugated hollow members 50 are alternately changed between an expanded or projected condition (which corresponds to a condition shown by broken lines in FIG. 7) and a contracted or retracted condition (which corresponds to a condition shown by solid lines in FIG. 7). Due to the alternating motion of the corrugated hollow members 50, the backside of the passenger P is alternately pushed or pressed by the lid portions 50b the corrugated hollow members 50 so that a massaging action is exerted on the backside of the passenger P. Further, in this embodiment, the control unit of the actuator 14 is typically constructed such that the respective massaging elements 12a-12h can be individually controlled. However, as previously described, the control unit can be modified such that the massaging elements 12a-12h can be controlled two at a time.

Optionally, the supplemental massaging unit 47 (the vibrator) is actuated so as to generate vibration. The generated vibration is transmitted to the three pairs of massaging elements 12c-12h via the lower retainer spring 24b so as to assist and increase the massaging action of the corrugated hollow members 50 of the massaging elements 12c-12h.

As shown in FIG. 7, the corrugated hollow members 50 of the massaging elements 12a and 12b may push or press a portion above the shoulder level (i.e., the lower neck) of the passenger P. At this time, the corrugated hollow members 50 can push the lower neck of the passenger P at a suitable angle because the moving axis direction X of each of the massaging elements 12a and 12b is directed more downwardly than the moving axis direction Y of each of the massaging elements 12c-12h. Further, when the passenger P is a large passenger P', the corrugated hollow members 50 of the massaging elements 12a and 12b may push or press around the shoulders of the passenger P'. Again, the corrugated hollow members 50 can push the shoulders of the passenger P' at a suitable angle. Conversely, the corrugated hollow members 50 of the massaging elements 12c-12h may push or press a substantially central portion of the back of the passenger P (P'). As will be apparent, the corrugated hollow members 50 can push the central back portion of the passenger P (P') at a suitable angle (i.e., at substantially a right angle).

According to the present seat 1 having the massaging mechanism 10, when the massaging mechanism 10 is operated, the corrugated hollow members 50 may effectively exert a massaging action on the passenger P. Conversely, when the massaging mechanism 10 is not operated, the corrugated hollow members 50 do not provide discomfort to the passenger P because the corrugated hollow members 50 can be easily contracted along with the cushion pad 26. In addition, each of the lid portions 50b of the corrugated hollow members 50 has a diameter of about 60 mm. Therefore, the corrugated hollow members 50 (the lid portions 50b) may produce a comfortable massaging action similar to a palm type of massaging action.

As shown in FIG. 5B, when the corrugated hollow members 50 are in a normal condition, each of the lid portions 50b has an outer convex surface that is slightly protruded outwardly. However, as shown in FIG. 5A, when the massaging mechanism 10 is operated so that the corrugated hollow members 50 are in an expanded condition, each of the lid portions 50b is further protruded outwardly so as to have a substantially arcuately protruded surface. This may lead to an increased and effective massaging action. On the contrary, as shown in FIG. 5C, when the massaging mechanism 10 is (reversely) operated so that the corrugated hollow members 50 are in a contracted condition, each of the lid portions 50b is flattened so as to have a substantially flat surface.

Figure 8:
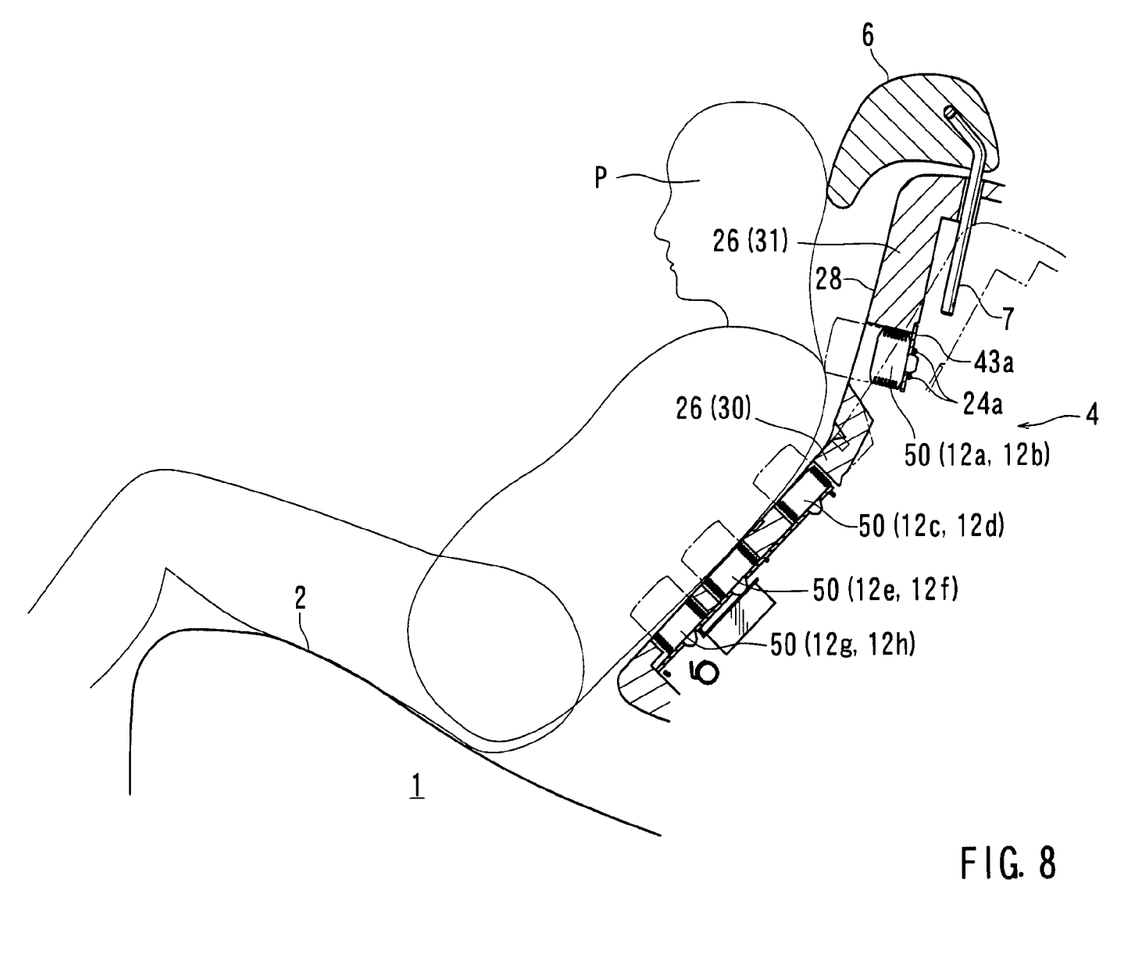
FIG. 8 is a vertical cross-sectional view of the vehicle seat having the massaging mechanism, illustrating a condition in which the passenger is sitting on the seat in which the seat back is in a reclined and tilted position.
Figure 9:
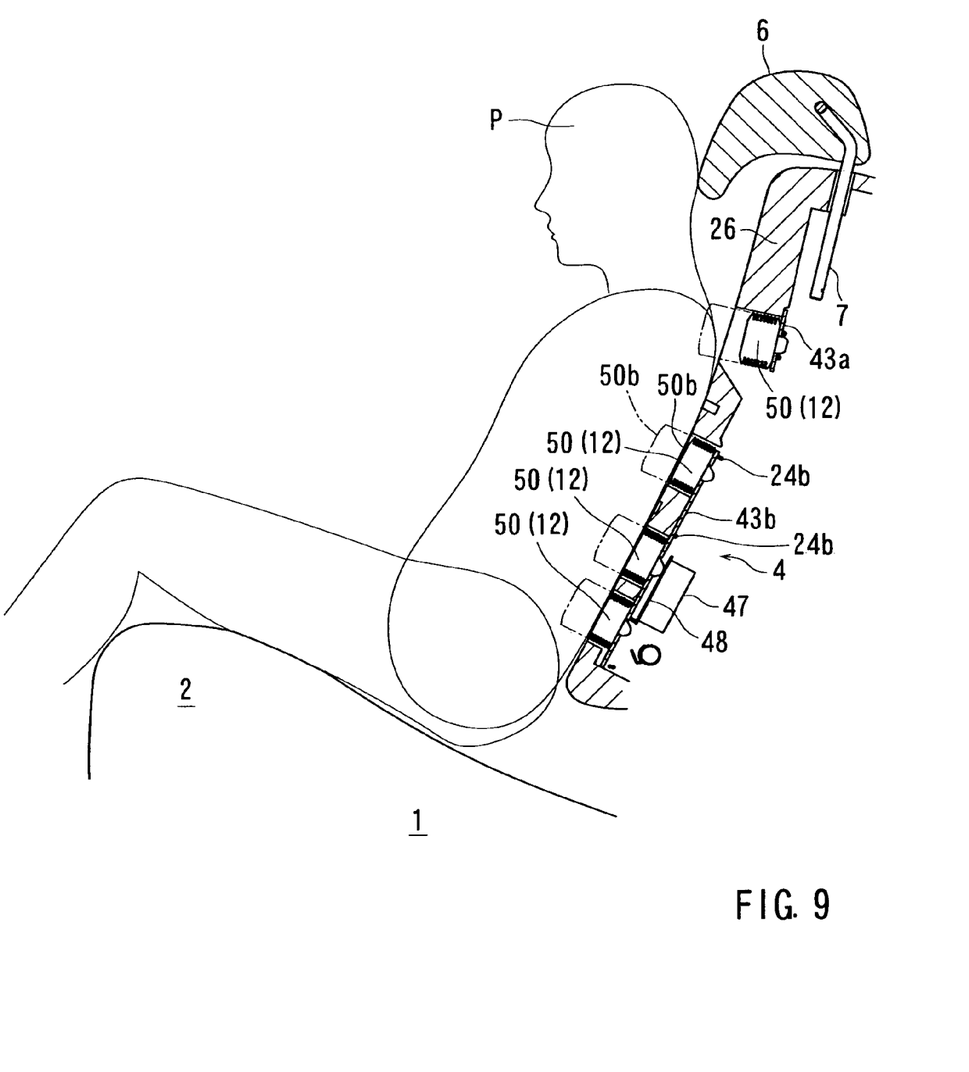
FIG. 9 is a vertical cross-sectional view of the vehicle seat having the massaging mechanism, illustrating a condition in which the passenger is sitting on the seat in which the seat back is in the normal position.

Further, as shown in FIG. 8, the upper portion 4a of the seat back 4 can be tilted forwardly relative to the lower portion 4b so that the seat back 4 is in a tilted position. Also, as shown in FIG. 9, the seat back 4 can be inclined forwardly from the reclined position shown in FIG. 7 so as to be in a relatively normal position. In each position of the seat back 4, the massaging action can be effectively exerted on the backside of the passenger P. Naturally, when the seat back 4 is in the positions shown in FIGS. 8 and 9, the backside of the passenger P can be massaged at regions different from the regions that can be massaged when the seat back 4 is in the reclined position shown in FIG. 7. Therefore, it is possible to widely and variably massage the backside of the passenger P by suitably changing the position of the seat back 4.

When the seat back 4 is changed from the reclined position shown in FIG. 7 to the tilted position shown in FIG. 8, the corrugated hollow members 50 of the massaging elements 12a and 12b may preferably be dislocated downwardly relative to the backside of the passenger P (i.e., the moving axis direction X of each of the massaging elements 12a and 12b is further inclined downwardly). Therefore, when the massaging mechanism 10 is operated after the seat back 4 is thus shifted (FIG. 8), the massaging elements 12a and 12b can exert the massaging action on the shoulders of the passenger P. Conversely, when the seat back 4 is inclined forwardly from the reclined position toward the normal position, the corrugated hollow members 50 of all of the massaging elements 12a-12h may preferably be dislocated downwardly relative to the backside of the passenger P. Therefore, when the massaging mechanism 10 is operated after the seat back 4 is thus shifted (FIG. 9), the massaging elements 12a and 12b can exert the massaging action on the shoulders of the passenger P. At the same time, the massaging elements 12c-12h can exert the massaging action on a lower central portion (i.e., the central portion including the lumbar region) of the back of the passenger P. Further, in each position of the seat back 4, the massaging elements 12a and 12b can push the lower neck or the shoulders of the passenger P at the suitable angle because the moving axis direction X of each of the massaging elements 12a and 12b is appropriately inclined as described above.

Naturally, various changes and modifications may be made to the present teachings without departing from the scope of the invention. For example, the seat 1 is not limited to the reclinable and partly tiltable type of front seat. Therefore, the seat 1 can be a non-reclinable rear seat, a non-tiltable front seat or other such seats.

The through bores 37 formed in the cushion pad 26 are not limited to the cylindrical bores. That is, the through bores 37 may be formed in a variety of cross-sectional shapes other than a circular shape. For example, the cross-sectional shape of the through bores 37 may be a polygonal shape (e.g., a pentagonal shape and a hexagonal shape), a pentagram shape or other such shapes. Similarly, the lid portion 50b of the corrugated hollow members 50 are not limited to circular shapes.

Further, if necessary, the cross-sectional shape of the through bores 37 can be different from the shape of the lid portion 50b. For example, the through bores 37 can be formed in the polygonal shape in cross-section. Conversely, the lid portion 50b of the corrugated hollow members 50 can be formed in a inscribed circular shape. On the contrary, the through bores 37 can be formed in the circular shape in cross-section. Conversely, the lid portion 50b of the corrugated hollow members 50 can be formed in a inscribed polygonal shape.

In this embodiment, the through bores 37 are formed so as to have a diameter of about 60 mm. However, the through bores 37 can be formed so as to have a variety of diameters. The diameter of the through bores 37 may preferably be greater than about 30 mm, more preferably from about 40 mm to 70 mm.

The number of through bores 37 (the corrugated hollow members 50) can be changed, if necessary. Also, the arrangement of the through bores 37 (the corrugated hollow members 50) can be changed, if necessary. For example, the through bores 37 (the corrugated hollow members 50) can be asymmetrically or randomly disposed in the cushion pad 26.

In this embodiment, each of the corrugated hollow members 50 is formed as a single corrugated hollow cylinder. However, each of the corrugated hollow members 50 can be formed as a combination of a plurality of corrugated cylinders that can be independently expanded and contracted, if necessary. In addition, in this embodiment, although the corrugated hollow members 50 are expanded and contracted by air, it is possible to substitute nitrogen or other such gases for air.

Furthermore, in this embodiment, each of the massaging elements 12a-12h is formed as the corrugated hollow member 50. However, the massaging elements 12a-12h can be constructed as a piston-cylinder assembly in which a piston is slidably received within a cylinder.

In addition, in this embodiment, the air pipes 41 are connected to the second connecting portions 65 of the connector units 60 after the upper and lower attachment plates 43a and 43b, assembled with the corrugated hollow members 50 and the connector units 60, are connected to the upper and lower retainer springs 24a and 24b. However, the upper and lower attachment plates 43a and 43b, assembled with the corrugated hollow members 50 and the connector units 60, can be connected to the upper and lower retainer springs 24a and 24b after the air pipes 41 are connected to the second connecting portions 65 of the connector units 60, if necessary.

The invention claimed is:

1. A vehicle seat having a seat back, the seat back comprising:
    a back frame,
    a retainer spring arranged in the form of a wire that extends transversely within the back frame, the retainer spring including a central portion that projects rearwardly,
    a cushion pad attached to the back frame, the cushion pad having a plurality of cylindrical through bores that pass therethrough in the direction of thickness thereof, and
    a massaging unit having a plurality of massaging elements, the massaging elements being constructed so as to be elastically deformed or compressed along moving axes and to be pneumatically expanded and contracted along the moving axes,
    wherein the massaging elements are formed as corrugated hollow members,
    wherein the massaging elements include massaging end portions, each massaging end portion having a circular shape that substantially corresponds with the cross-sectional shape of a corresponding one of the cylindrical through bores,
    wherein the massaging elements are disposed in the cylindrical through bores in a manner that the moving axes of the massaging elements extend along longitudinal axes of the cylindrical through bores,
    wherein the massaging elements are disposed on the central portion of the retainer spring, so as to be attached to the back frame via the retainer spring; and
    wherein the massaging elements have deformability or compressibility identical with or greater than the deformability or compressibility of the cushion pad when the massaging elements are not operated.

2. The vehicle seat as defined in claim 1 further comprising an actuator that is in fluid communication with the massaging elements via air pipes, and connector units that can interconnect the air pipes and the massaging elements, each of the connector units comprising a first connector element having a first connecting portion that can be connected to the massaging element, and a second connector element having a second connecting portion that can be connected to the air pipe,
    wherein the massaging elements are attached to the back frame via an attachment member, and
    wherein the first and second connector elements of each of the connector units are arranged and constructed such that the first and second connecting portions can be positioned on opposite sides of the attachment member.

3. The vehicle seat as defined in claim 2, wherein the first and second connector elements of each of the connector units are arranged and constructed such that the first and second connecting portions can respectively extend along the attachment member.

4. The vehicle seat as defined in claim 3, wherein each of the massaging elements has a connecting projection that extends along the attachment member.

5. The vehicle seat as defined in claim 2, wherein the first connecting portion extends from a first body portion of the first connector element, wherein the second connecting portion extends from a second body portion of the second connector element, and wherein the second body portion is rotatably coupled to the first body portion so that the second connecting portion can rotate relative to the first connecting portion.

6. The vehicle seat as defined in claim 1, wherein the moving axes of some of the massaging elements are directed to a direction different from the direction of the moving axes of the remaining massaging elements.

7. The vehicle seat as defined in claim 6, wherein the moving axes of the massaging elements positioned on an upper side of the back frame are directed more downwardly than the moving axes of the massaging elements positioned on a lower side of the back frame.

8. The vehicle seat as defined in claim 7, wherein the back frame is divided into an upper frame portion and a lower frame portion, and wherein the upper frame portion can be tilted back and forth relative to the lower frame portion.

9. The vehicle seat of claim 1 further comprising an attachment plate disposed between the retainer spring and the massaging elements.

10. A vehicle seat having a seat back, the seat back comprising:
    a back frame, a retainer spring arranged in the form of a wire that extends transversely within the back frame, the retainer spring including a central portion that projects rearwardly, a cushion pad attached to the back frame, the cushion pad having a plurality of cylindrical through bores that pass therethrough in the direction of thickness thereof, and a massaging unit having a plurality of corrugated hollow members that are attached to the back frame via upper and lower attachment plates, the corrugated hollow members being constructed so as to be elastically deformed or compressed along moving axes;

an actuator in fluid communication with the corrugated hollow members via air pipes so that the corrugated hollow members can be pneumatically expanded and contracted along the moving axes, and connector units disposed between the air pipes and the corrugated hollow members, each of the connector units comprising a first connector element having a first connecting portion that can be connected to the corrugated hollow member, and a second connector element having a second connecting portion that can be connected to the air pipe, wherein each of the corrugated hollow members include a lid portion having a circular shape that substantially corresponds with the cross-sectional shape of a corresponding one of the cylindrical through bores, wherein the corrugated hollow members are disposed in the cylindrical through bores in a manner that the moving axes of the corrugated hollow members extend along longitudinal axes of the cylindrical through bores, wherein the massaging elements are disposed on the central portion of the retainer spring, so as to be attached to the back frame via the retainer spring, wherein the first and second connector elements of each of the connector units are arranged and constructed such that the first and second connecting portions can be positioned on opposite sides of the attachment member, and wherein the moving axes of the corrugated hollow members attached to the back frame via the upper attachment plate are directed downwardly than the moving axes of the corrugated hollow members attached to the back frame via the lower attachment plate.

11. The vehicle seat of claim 10 wherein the upper and lower attachment plates are disposed between the retainer spring and the massaging elements.

* * * * *